United States Patent [19]

Buckwald et al.

[11] Patent Number: 5,298,284
[45] Date of Patent: Mar. 29, 1994

[54] METHOD OF MAKING A SWELLING CABLE WRAP

[75] Inventors: Holger Buckwald, Hemsbach; Ingrid Schaffert, Hirschberg-Leutershausen; Werner Schäfer, Birkenau, all of Fed. Rep. of Germany

[73] Assignee: Carl Freudenberg, Weinheim/Bergstrasse, Fed. Rep. of Germany

[21] Appl. No.: 960,891

[22] Filed: Oct. 14, 1992

[30] Foreign Application Priority Data

Oct. 17, 1991 [DE] Fed. Rep. of Germany ....... 4134370

[51] Int. Cl.$^5$ .............................................. B05D 1/36
[52] U.S. Cl. .................................... 427/203; 427/202; 427/261; 427/288; 428/206; 174/118
[58] Field of Search ............... 427/202, 203, 261, 288; 428/283, 206; 174/118, 121 SR, 23 C; 101/129

[56] References Cited

U.S. PATENT DOCUMENTS

| | | | |
|---|---|---|---|
| 3,093,502 | 6/1963 | Drelich | 427/203 |
| 3,995,552 | 12/1976 | Mitter | 101/122 |
| 4,820,560 | 4/1989 | Buchwald et al. | 428/283 |
| 5,082,719 | 1/1992 | Arreyo | 428/219 |

Primary Examiner—Terry J. Owens
Attorney, Agent, or Firm—Felfe & Lynch

[57] ABSTRACT

A cable wrap which swells upon contact with water is made by coating one side of a nonwoven fabric support with a polyvinyl alcohol binding agent and then with a superabsorber powder, drying the coated fabric between contact surfaces, printing a polyacrylate binding agent plaste onto the superabsorber surface, and then drying the coated fabric. Alternatively, the cable wrap can be made by printing a polyacrylate binding agent paste onto a nonwoven fabric support, applying a polyvinyl alcohol binding agent onto the polyacrylate binding agent paste, sprinkling superabsorber powder onto the polyvinyl alcohol binding agent, and drying the coated fabric between contact surfaces.

2 Claims, No Drawings

METHOD OF MAKING A SWELLING CABLE WRAP

FIELD OF THE INVENTION

This invention relates to a novel swelling cable wrap comprising a nonwoven support layer coated on one side thereof with a swelling medium (superabsorber) in powder form, as well as to a novel method of making it.

BACKGROUND OF THE INVENTION

Nonwoven cable wraps consist, as a rule, of a support layer of strong, thin nonwoven fabric coated on one side with a swelling medium, usually a powder, which upon contact with water swells abruptly to many times its initial bulk and consists, for example, of the cross-linked sodium salt of a polyacrylic acid. Such a swelling medium is usually referred to as a "superabsorber."

Water in telephone cables can lead to the failure of entire distribution networks; in the case of fiber cables it can lead to severe attenuation of the transmission output.

In plastic-insulated medium and high-voltage cables, moisture, especially in combination with contamination or air bubbles in the insulating structure and sufficiently great field strength, can cause so-called "water treeing" leading to the destruction of the insulation layer.

If the outer jacket of cables is damaged, for example when they are laid or during later road work, water can penetrate into the cable structure and propagate over long distances along the axis, especially in the shielding in power cables.

To prevent this, that is, to limit the local damage, is the purpose of a swellable cable wrap. In the case of damage, upon the entry of water, a blocking effect is produced by the rapid swelling of the wrap by the swelling medium and the resultant swelling pressure closing up voids and preventing the water from spreading out along the axis. The damage remains limited to a short distance of 1 to 2 m. For this purpose it is necessary for the reaction time of the swelling wrap to be as short as possible.

In power cables in the medium and high voltage range it is also necessary, depending on the principle of construction, that corresponding cable wraps which are disposed between the outer conductive layer and the shielding, be treated to make them electrically conductive. A permanent electrical contact between the shielding and the outer conductive layer must be assured. Such contact can be assured by the incorporation of conductive carbon black when making the wrap.

The wraps described can be either applied continuously lengthwise or wound with an overlap. Depending on the cable diameter and construction, the width of the band can be between 10 and 300 mm. Special wraps outside of this range are also possible. The thickness of the wraps can vary between 0.1 and 1 mm.

In the manufacture and handling of the wrap, to prevent the superabsorber from coming loose due to bending and creeping or to mechanical influences, coverings are used on the superabsorber, which are made of gossamer-thin nonwoven material. Also in the interest of minimizing health hazards in the workplace the superabsorber is covered with a thin nonwoven during the manufacture of such cables. This is described in the German periodical, "Drahtwelt," 2, 1989, "Quellvliesstoffe für längswasserdichte Kabelkonstruktionen" (swelling nonwovens for longitudinally water-tight cable designs) page 14, left and right columns.

Such covering, however, has the disadvantage that the free swelling of the superabsorber is considerably hampered, since the free space available for the swelling is reduced by the covering.

In special cable designs—for example in so-called "chamber cables," in the fiber-optic cable field, or also in the case of great diameters of the shielding wires in power cables, free swelling is essential for the purpose of reliably closing up large voids. If this is not assured, the propagation of moisture lengthwise of the cable cannot be prevented with sufficient reliability.

Under the designation 3 E 111, manufactured by LANTOR BV in the Netherlands, a cable wrap is commercially available in which 15 to 40 g/m$^2$ of superabsorber is fixed by means of a binding agent on a thin, high strength nonwoven support. The swelling agent is prevented from dropping off by applying large amounts in proportion to the amount of superabsorber to the nonwoven support. The superabsorber is pressed into the cable wrap by calender rolls to bond it more tightly.

This embodiment, which does not require any separate covering of the superabsorber and in which substantial amounts of the absorber are exposed, also has the disadvantage that the swelling is appreciably delayed upon entry of water; within 1 minute, far less than 90% of the final swelling thickness is reached since the swelling agent must first free itself from its embedded state in the binding agent by its own swelling pressure.

There are limits to reducing the amount of binding agent, because if too little binding agent is applied the superabsorber would powder off appreciably as soon as the product is transported or handled.

OBJECTS OF THE INVENTION

It is an object of the present invention to provide a cable wrap with a superabsorber surface freely accessible to water, which requires no covering and does not release superabsorber from the wrap either during its production or during its use, when flexed, folded or subjected to abrasive action, but upon contact with water reaches at least 90% of its final swollen thickness within 1 minute.

Another object of the present invention is to provide a cable wrap which, in its swollen state, fills out minor undercuts, voids and wrinkles in the system of the cable interior, and, in accordance with the cable manufacturer's requirements, optionally has a volume resistance per unit area of no more than 5000 ohms/cm$^2$.

Still another object of the present invention is to provide a method of manufacture for producing a binding agent imprint pattern.

Other objects and advantages of the present invention will become apparent as the description thereof proceeds.

DESCRIPTION OF THE INVENTION

The above objects are achieved in accordance with the present invention by means of a swelling cable wrap consisting of a nonwoven support layer, a coating of swelling agent (superabsorber) in powder form applied to one side of the support layer in an amount of 15 to 40 g/m$^2$, where the superabsorber is fixed on one side of the nonwoven support by no more than 3 g/m$^2$ of a binding agent and a second binding agent is applied to the superabsorber layer in the form of a uniform, repeating print pattern in the shape of dots, lines or bars which covers 10 to 20% of the surface of the superabsorber layer, and the swelling capacity of the superabsorber upon entry of water is at least 90% of the terminal value of the swelling height within 1 minute.

The base of the cable wrap according to the present invention is formed by a conventional nonwoven layer which, in the interest of its workability, has to be as thin as possible and should have a high longitudinal tensile strength (longitudinal strength from 150 to 200 N/5 cm).

The superabsorber, applied in an amount of 15 to 40 g/m$^2$, is fixed on one surface of the nonwoven support by means of a binding agent in an amount not to exceed (in the dry state) 3 g/m$^2$. The binding agent is spread over the surface of the superabsorber and may be soluble (polyvinyl alcohol, for example) or insoluble (polyacrylate, for example).

According to the present invention, a second application of binding agent is then applied in the form of a uniform, repeating pattern covering 10 to 20% of the superabsorber surface. The pattern is in the form of dots, lines or bars.

Such a cable wrap in the state of a free, disk-shaped test sample swells in contact with water to at least 90% of its terminal thickness within 1 minute, that is, it swells immediately and swelling is virtually complete within 1 minute.

If the area imprinted with the second binding agent is less than the stated percentage, a significant increase in attrition and powdering off of swelling agent will occur. On the other hand, if the maximum limit of surface coverage is exceeded, swelling is increasingly impaired; the swelling is retarded, and the progress of the swelling in time approaches that of the state of the art, that is, if the coat of binding agent on the superabsorber covers the latter's entire surface.

The cable wrap according to the present invention immediately penetrates into voids and wrinkles of chambered cables upon contact with water and fills the same.

It is surprising that, despite the large proportions of superabsorber which are not covered with binding agent or are in contact therewith, no loss of superabsorber occurs either during manufacture or during storage or winding of the wrap. It also withstands rubbing action without appreciably powdering off; it is just as resistant to rub-off as the cable wrap according to the state of the art whose entire surface is covered with binding agent.

The binding agent imprint may be in the form of a pattern printed upon the superabsorber in the direction of the nonwoven material surface, which forms with the superabsorber particles a substantially planar surface. Surprisingly, this variant is also very resistant to rub-off. This is probably due to the fact that an especially smooth surface is formed where both the superabsorber particles and the imprinted pattern of binding agent are amalgamated into a tight surface.

All of the embodiments of the cable wrap in accordance with the present invention can also be treated to make them electrically conductive. For this purpose carbon black particles are homogeneously embedded both in the nonwoven support and in the applied binding agent. A uniform volume resistance $R_A$ is easily obtained in accordance with DIN 53 482/VDE 0303, Part 3.6, 5th Ed. (1983) which, according to the most common requirements of the cable industry must amount to no more than 5000 ohms/cm$^2$.

In order to produce such electrically (semi) conductive properties, it is known to provide the binding agent as well as the nonwoven support uniformly with carbon black at the rate of 50 to 200% by weight (dry). The particle sizes are generally between 0.001 and 0.1 mm.

In accordance with one variant of the process of preparing the cable wrap pursuant to the present invention, a maximum of 3 g/m$^2$ (measured dry) of a binding agent is sprayed or applied to one surface of the nonwoven support in the form of an aqueous foam mixture.

The longitudinal strength of the nonwoven support should be between 150 and 200 N/5 cm to enable the wrap to be wound tightly around the cable. Within these requirements, the support material must, of course, be as thin as possible so as to be able to be wound tightly even around tight curvatures in the shape of the cable.

If the cable wrap is to be made electrically semiconductive, 50 to 200% by weight of carbon black is embedded uniformly into the fibers during the production of the nonwoven in conventional manner.

The binding agent which serves to bind the swelling powder onto the nonwoven support is sprayed onto the nonwoven in the form of a 5% aqueous solution if the binding agent is of the soluble type. However, it is also possible to use it in the form of a foam mixture if the binding agent is of the insoluble type, which is particularly easy since the aqueous solution can be foamed without adding any foaming adjuvants simply by whipping air into it.

The amount of binding agent required for a particular case to fix the swelling powder onto the nonwoven support has to be determined by preliminary tests to determine the maximum point at which the superabsorber just begins to swell slightly upon contact with water. These preliminary tests, however, do not necessitate any appreciable time or effort.

15 to 40 g/m$^2$ of superabsorber powder are sprinkled onto the still wet coat of binding agent. The powder immediately draws the water from the binding agent and swells slightly at the contact surface, thereby adhering to the nonwoven. Immediately thereafter, the treated nonwoven is dried between contact surfaces heated to between 120° to 160° C., thereby fixing the superabsorber onto the support, and at the same time its surface is slightly smoothed out.

In the subsequent operation the superabsorber surface is provided with a second application of binding agent, followed by drying with heat accompanied by removal of moisture. In this operation the second coat of binding agent in the form of an aqueous paste with a viscosity of 16,000 to 20,000 cP is printed onto the superabsorber layer by means of a rotary printing screen device in the form of a repeat pattern. The stencil has a print area of 10 to 20% and produces a uniform pattern in the form of dots, lines or bars. This is followed by drying, which produces a slightly raised, repeat pattern.

If the cable wrap is to be imparted with a maximum volume resistance of 5000 ohms/cm$^2$ pursuant to DIN 53,482/VDE 0303, Part 3.6, 5th Edition (1983), 50 to 200 wt.-% of uniformly distributed, finely granular carbon black (dry) is simply admixed with the binding agent paste in conventional manner before the printing is performed.

The preparation of another variant of the cable wrap in which the printed pattern forms a planar surface with the superabsorber is effected by imprinting the nonwoven support layer in a single operation with an aqueous binding agent paste which has a viscosity of 16,000 to 20,000 cP. The printing is also performed with a rotary printing screen apparatus in which the printing screen has a print area of 10 to 20% and a uniform printing pattern in the form of dots, lines or bars.

Immediately thereafter, a maximum of 3 g/m² (dry) of a binding agent in the form of a 5% aqueous solution is applied by spraying or in the form of an aqueous foam mixture. Subsequently, the superabsorber powder is sprinkled onto the still wet binding agent at the rate of 15 to 20 g/m², and then the coated material is dried between contact surfaces at 120 to 160°. At the same time the entire coating is smoothed and fixed on the nonwoven support.

The result is an especially smooth, even, non-abrasive surface in which nevertheless substantial parts of superabsorber are freely available for contact with water.

The ability to swell of the two embodiments of the cable wrap pursuant to the present invention was tested as follows:

A horizontally positioned, disk-shaped sample was loaded very lightly (2.5 g/cm²) with a ram which was free to move up and down, and an excess of distilled water was applied to the sample at a predetermined spot. The time and the vertical displacement of the ram were measured during swelling. The sample with the raised print pattern as well as the smooth-surfaced sample reached 90% of their final swelling thickness within 1 minute. Their resistance to rubbing off was so good that, in the dry state, the swelling medium was not significantly scraped away when the surface of the cable wrap was scratched with a finger nail.

While the present invention has been illustrated with th aid of certain specific embodiments thereof, it will be readily apparent to others skilled in the art that the invention is not limited to these particular embodiments, and that various changes and modifications may be made without departing from the spirit of the invention or the scope of the appended claims.

We claim;

1. The method of manufacturing a swelling cable wrap, which comprises applying no more than 3 g/m² of a polyvinyl alcohol binding agent in aqueous 5 wt.-% solution to one face of a nonwoven fabric support which is sufficiently thin to be wrapped tightly around a cable and which has a longitudinal tensile strength of 150 to 200 N/5 cm by spraying or in the form of an aqueous foam mixture, sprinkling 15 to 40 g/m² of a superabsorber powder onto said binding agent while still wet to form a coated nonwoven fabric support, drying the coated nonwoven fabric support between contact surfaces at 120° to 160° C. whereby said superabsorber is smoothly fixed on the nonwoven fabric support, applying a polyacrylate binding agent to the superabsorber surface by imprinting it upon the superabsorber surface as an aqueous paste with a viscosity of 16,000 to 20,000 cP by means of a rotary printing screen having a print area of 10 to 20% to form a repeating pattern in the form of dots, lines or bars to form an impregnated product, and drying said impregnated product.

2. The method of manufacturing a swelling cable wrap, which comprises imprinting one face of a nonwoven fabric support which is sufficiently thin to be wrapped tightly around a cable and which has a longitudinal tensile strength of 150 to 200 N/5 cm with an aqueous polyacrylate binding agent paste having a viscosity of 16,000 to 20,000 cP in the form of a uniform print pattern of dots, lines or bars with a rotary printing screen having a print area of 10 to 20%, applying to the binding agent paste while still wet no more than 3 g/m² of an aqueous 5 wt.-% solution of a polyvinyl alcohol binding agent by spraying or in the form of an aqueous form mixture, sprinkling 15 to 40 g/m² of superabsorber powder onto the polyvinyl alcohol binding agent while still wet to form a coated nonwoven fabric support, and drying the coated nonwoven fabric support between contact surfaces at 120° to 160° C. while at the same time smoothing and fixing the polyvinyl alcohol binding agent, superabsorber, and polyacrylate binding agent paste on the nonwoven fabric support.

* * * * *